US007040846B2

(12) United States Patent
Couto

(10) Patent No.: US 7,040,846 B2
(45) Date of Patent: May 9, 2006

(54) TRANSIT BRACKET ASSEMBLY FOR MOTORCYCLES

(76) Inventor: Stephen Couto, 79 Arrow Rd., Hilton Head, SC (US) 29928

( * ) Notice: Subject to any disclaimer, the term of this patent is extended or adjusted under 35 U.S.C. 154(b) by 0 days.

(21) Appl. No.: 11/112,418

(22) Filed: Apr. 25, 2005

(65) Prior Publication Data
US 2005/0191144 A1 Sep. 1, 2005

Related U.S. Application Data

(62) Division of application No. 10/422,169, filed on Apr. 24, 2003, now Pat. No. 6,902,363.

(60) Provisional application No. 60/377,755, filed on May 6, 2002.

(51) Int. Cl.
B60P 3/06 (2006.01)
(52) U.S. Cl. ................... 410/3; 410/9; 410/19
(58) Field of Classification Search .............. 410/3, 410/4, 7, 8, 9, 17, 19, 22, 47, 48, 66, 77
See application file for complete search history.

(56) References Cited

U.S. PATENT DOCUMENTS

| 1,760,089 | A | * | 5/1930 | Snyder | 410/8 |
| 1,776,935 | A | * | 9/1930 | Snyder | 410/30 |
| 1,780,277 | A | * | 11/1930 | Seeley et al. | 410/8 |
| 1,780,282 | A | * | 11/1930 | Tucker | 410/9 |
| 1,794,321 | A | * | 2/1931 | Rebuck | 410/22 |
| 3,595,176 | A | * | 7/1971 | Broling | 410/33 |
| 3,753,579 | A | | 8/1973 | Kurilich, Jr. | |
| 3,843,156 | A | * | 10/1974 | Alfriend et al. | 410/49 |
| 4,102,274 | A | * | 7/1978 | Feary et al. | 410/50 |
| 4,516,710 | A | * | 5/1985 | Bott | 224/324 |
| 4,671,713 | A | * | 6/1987 | Lenkman | 410/7 |
| 5,674,033 | A | * | 10/1997 | Ruegg | 410/104 |
| 5,827,022 | A | * | 10/1998 | Tovani | 410/78 |
| 6,109,494 | A | | 8/2000 | Pilmore | |
| 6,164,882 | A | * | 12/2000 | Selle | 410/3 |
| 6,474,916 | B1 | | 11/2002 | Constantin | |
| 6,902,363 | B1 | * | 6/2005 | Couto | 410/3 |
| 2003/0012617 | A1 | * | 1/2003 | Constantin | 410/7 |
| 2003/0143052 | A1 | * | 7/2003 | Fehrle et al. | 410/46 |
| 2004/0253071 | A1 | * | 12/2004 | Floe | 410/3 |

* cited by examiner

Primary Examiner—H. Gutman
(74) Attorney, Agent, or Firm—C. J. Fleming

(57) ABSTRACT

The apparatus for attachment to a non-inflatable part of a tandem, two-wheel cycle for rigidly mounting the cycle for transit purposes includes a bracket-like member adapted to be secured to the frame or other non-inflatable part of the cycle. A multi-part assembly is connected to the bracket for supporting the same for movement in longitudinal, transverse and vertical directions. The multi-part assembly includes a component adapted to be secured to the bed of a trailer or other transit vehicle. The multi-part assembly includes an adjustable securing mechanism for fixing the position of the bracket-like member.

4 Claims, 6 Drawing Sheets

TRANSIT BRACKET ASSEMBLY FOR MOTORCYCLES

The present application is a division of application Ser. No. 10/422,169, filed Apr. 24, 2003 (based on provisional application 60/377,755 filed May 6, 2002) now U.S. Pat. No. 6,902,363.

BACKGROUND OF THE INVENTION

1. Field of the Invention

The present invention relates to a bracket assembly for rigidly securing a tandem, two-wheel cycle, such as a motorcycle, to the bed of a trailer, truck or other vehicle for transit purposes. In this regard, many owners of motorcycles desire to transport their machines to distant locations for various purposes, such as attending a show or rally. At the present time, the predominate technique for securing a motorcycle to the bed of a trailer, truck or other transit vehicle involves the use of multiple straps. These straps are time consuming to attach and unattach. Further, these straps often stretch or otherwise work loose during transit as the result of rough road conditions or centrifugal forces from turning of the transit vehicle at high speeds, all with potential exposure to damage to the motorcycle. The present invention obviates the use of straps by providing a bracket assembly that rigidly supports the motorcycle from the bed of a trailer, truck or other transit vehicle. The bracket assembly lends itself to inexpensive manufacture, easy installation and easy attachment to a motorcycle.

2. Description of the Prior Art

Attempts have been made to produce mechanisms that will support a motorcycle for transit purposes without using straps. Pilmore U.S. Pat. No. 6,109,494 shows such a device. This device consists of three subassemblies, a first subassembly that is attached to the bed of the trailer or other vehicle, a second subassembly attached to the motorcycle and a third subassembly which is detachably engaged with the first and second subassemblies. This arrangement has several disadvantages. First, the second subassembly is permanently attached to the motorcycle and detracts from the appearance of the cycle. Second, the third subassembly must be stored when the motorcycle is not supported for transit. Third, Pilmore mechanism does not provide for vertical adjustment thus forcing the user to locate or maneuver the cycle to a precise location on the bed prior to attachment. Finally, the mechanism disclosed in the '494 patent consists of many parts with consequent manufacturing expense.

Doyle U.S. Pat. No. 4,437,597 and Merritt U.S. Pat. No. 5,301,817 show motorcycle transit bracket assemblies. However, the mechanisms shown in these two patents attach to the tires of the motorcycle. Tires will flex in response to load forces to which the moving trailer or vehicle is subjected thereby permitting undesired movement of the cycle relative to the trailer or vehicle. Further, the shape of the tire will change in response to variances in tire pressure thus resulting in undesired movement of the cycle relative to the trailer or vehicle.

The following patents are of general interest: Slater, D375,472; Fonda U.S. Pat. No. 529,827; Mitchell U.S. Pat. No. 4,420,164; and Kallstrom U.S. Pat. No. 5,735,410. These patents disclose motorcycle stands; however, these stands are not adapted for transit purposes.

SUMMARY AND OBJECTS OF THE INVENTION

The present invention provides a transit bracket assembly for rigid attachment to the frame, or other non-inflatable part, of a cycle for supporting the same on the bed of a trailer or other vehicle without the use of straps. Thus, a primary object of the invention is to obviate the prior art use of straps in supporting a cycle for transit purposes.

Another object of the invention is the provision of a motorcycle transit bracket assembly that can be rigidly secured to the frame, or other non-inflatable part, of the cycle.

Still another object of the invention is the provision of a transit bracket assembly which provides for adjustment along longitudinal, transverse and vertical directions thus making unnecessary precise location of the cycle on the bed of the trailer or vehicle prior to attachment.

Yet another object of the present invention is the provision of a transit bracket assembly which has a minimum number of parts—all easy to manufacture—thus resulting in an assembly that is inexpensive.

These and other objects and advantages of the present invention will become apparent from the following description of a preferred embodiment.

DESCRIPTION OF THE INVENTION

Figure 1:
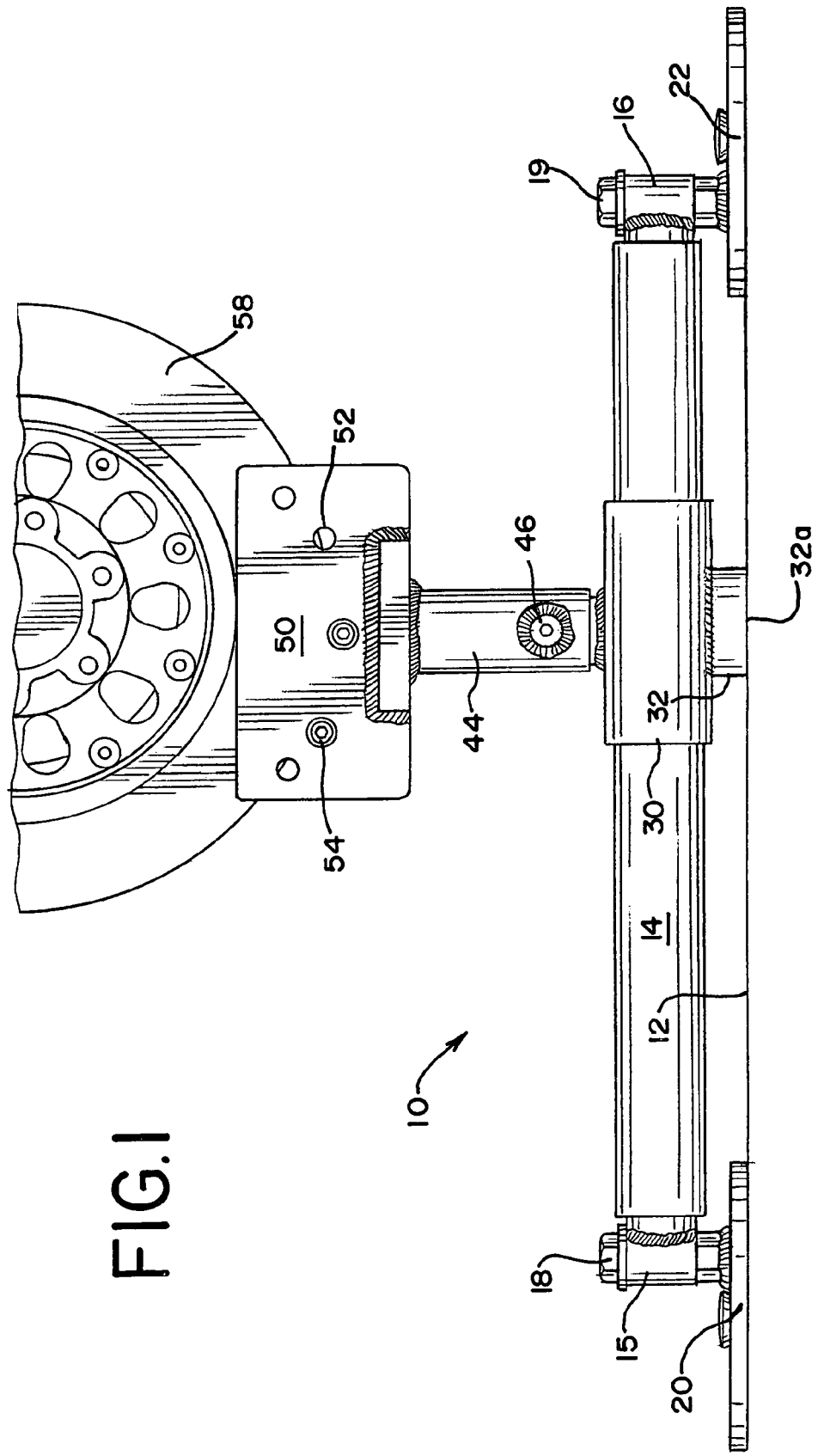
FIG. 1 is a side view of the bracket assembly attached to the brake disc of a motorcycle (not shown)
Figure 2:
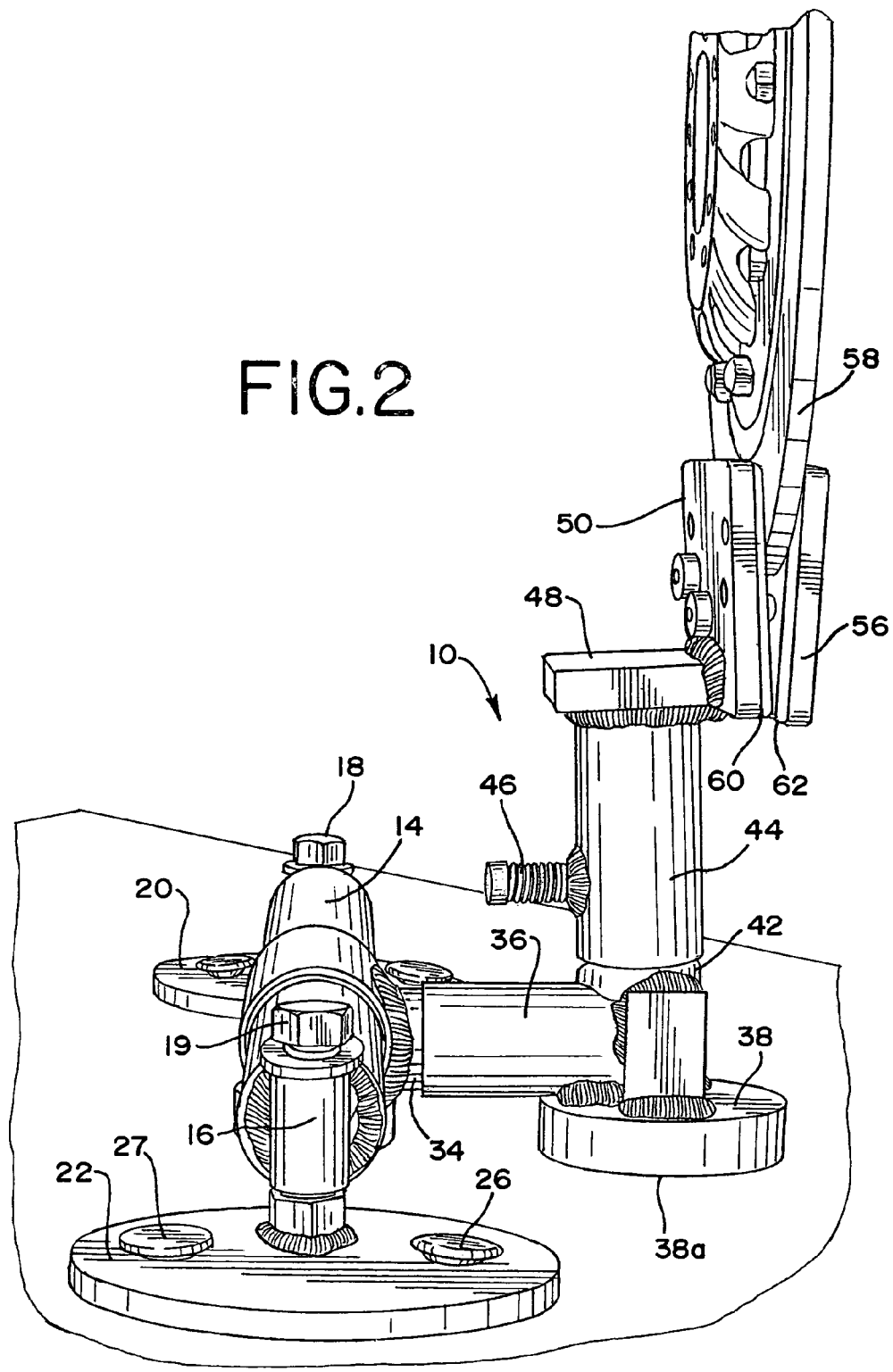
FIG. 2 is an end view of the bracket assembly and brake disc.
Figure 3:
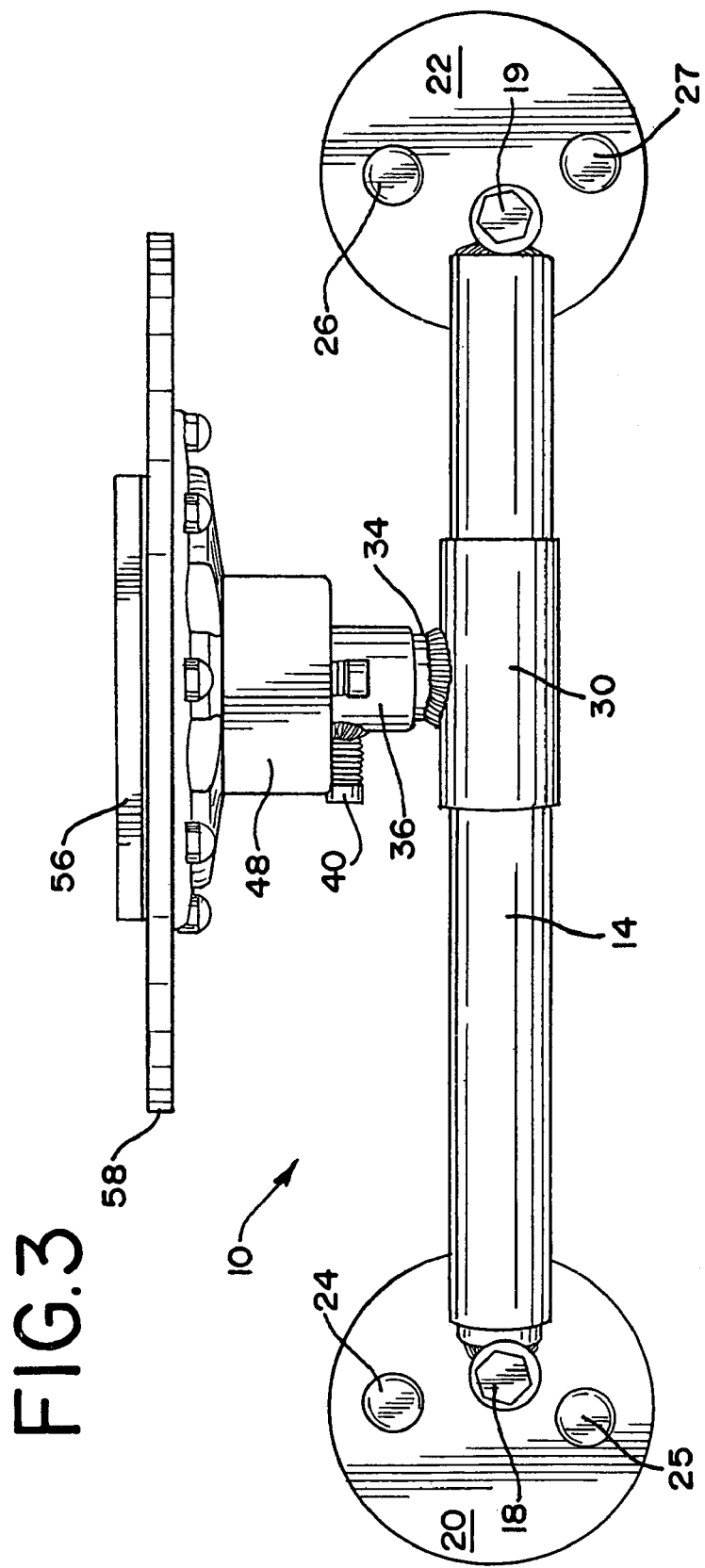
FIG. 3 is a top view of the bracket assembly and brake disc.

Referring to the embodiment of FIGS. 1–3, the bracket assembly, generally designated 10, is adapted to be mounted to the bed (represented by the line 12 in FIG. 1) of a trailer or truck (not shown). An elongated member 14, that may be in the form of a tube with a circular cross-section, has sleeves 15 and 16 attached to its opposite ends. These sleeves freely receive respective fasteners that may be in the form of bolts 18 and 19. The bolts 18 and 19 are threadingly engaged with the respective hubs of base plates 20 and 22. These base plates may be secured to the bed 12 of the transit vehicle by any convenient means, such as the fasteners 24–27 shown on FIG. 3.

A sleeve 30 is slideably engaged with the tube 14. The sleeve 30 is fastened, as by welding, to a foot plate 32; this foot plate has a flat bottom surface 32a for engagement with the bed 12 of the trailer or truck. The various parts are preferably dimensioned such that the bottom surface 32a of the foot-plate 32 will extend below a plane containing the bottom surfaces of the base plates 20 and 22. Thus, upon tightening of the bolts 18 and 19, the foot-plate 32 will act as a fulcrum (acting against the bed 12 of the trailer or truck) to bend and deform the tube 14 slightly thus causing binding engagement between the tube 14 and the sleeve 30. This binding engagement and the frictional engagement between the bottom surface 32a and the bed 12 prevent sliding movement of the sleeve 30 relative to the tube 14 as well as rotary movement of the sleeve 30 relative to the tube 14. Of course, in lieu of this binding engagement, a set-screw arrangement (not shown) may be provided for adjustably securing the sleeve 30 to the tube 14.

As seen in FIGS. 2 and 3, the sleeve 30 has a cylindrical member 34 attached thereto. The member 34 is slideably received within a sleeve 36 attached to a base assembly 38. This base assembly has a flat bottom surface 38a for engagement with the bed 12 of the trailer or truck. The sleeve 36 has a threaded aperture (not shown) for receiving a fastener, such as a bolt 40 (FIG. 3). This bolt acts as in the manner of a set-screw for adjustably positioning the member 34 relative to the sleeve 36.

The sleeve 36 has an upward extension 42 (FIG. 2) slideably received within another sleeve 44. The sleeve 44 has a threaded aperture (not shown) receiving a bolt 46. Thus, the bolt 46 acts as a set-screw adjustably securing the sleeve 44 to the upward extension 42. The sleeve 44 is secured, as by welding, to a plate 48; this plate is in turn secured to a vertically oriented plate 50. The plate 50 is provided with a plurality of apertures 52 for receiving fasteners, preferably in the form of bolts 54. A back plate 56 has a plurality of threaded openings (not shown) for threadingly receiving the bolts 54.

As best seen in FIG. 2, the plates 50 and 56 are arranged to engage opposite sides of a brake disc 58 forming part of the wheel assembly of a motorcycle (not shown). Pads 60 and 62, respectively attached to opposite sides of the plates 50 and 56, may be provided to prevent marring or scratching of the motorcycle brake disc.

In use, a motorcycle is positioned with one of its wheels adjacent the installed bracket assembly 12. The motorcycle need not be precisely positioned in view of the horizontal, transverse and vertical adjustment features of the bracket assembly to be referred to below. In this regard, it will be understood that one or both of the bolts 18 and 19 will be loosened to permit free sliding movement of the sleeve 30 relative to the tube 14. Preferably, the adjustment bolts 40 and 46 will also be loosened. The user will first position the plates 50 and 56 to engage respective opposite sides of the brake disc 58. The bolts 54 will then be tightened for secure engagement of the plates 50, 56 with the brake disc. Next, the bolt 46 will be tightened to secure the sleeve 44 to the cylindrical formation 42 that is attached to the sleeve 36. The fastener 40 will then be tightened to secure the sleeve 36 to the cylindrical formation 34 attached to the sleeve 30. Finally, one or both of the bolts 18 and/or 19 will be tightened to bind the sleeve 30 to the elongated tube 14.

It is preferable to mount a motorcycle for transit by providing two of the bracket assemblies, one for each wheel. The bracket assemblies may be of different sizes depending on the size and configuration of the motorcycle.

Figure 4:
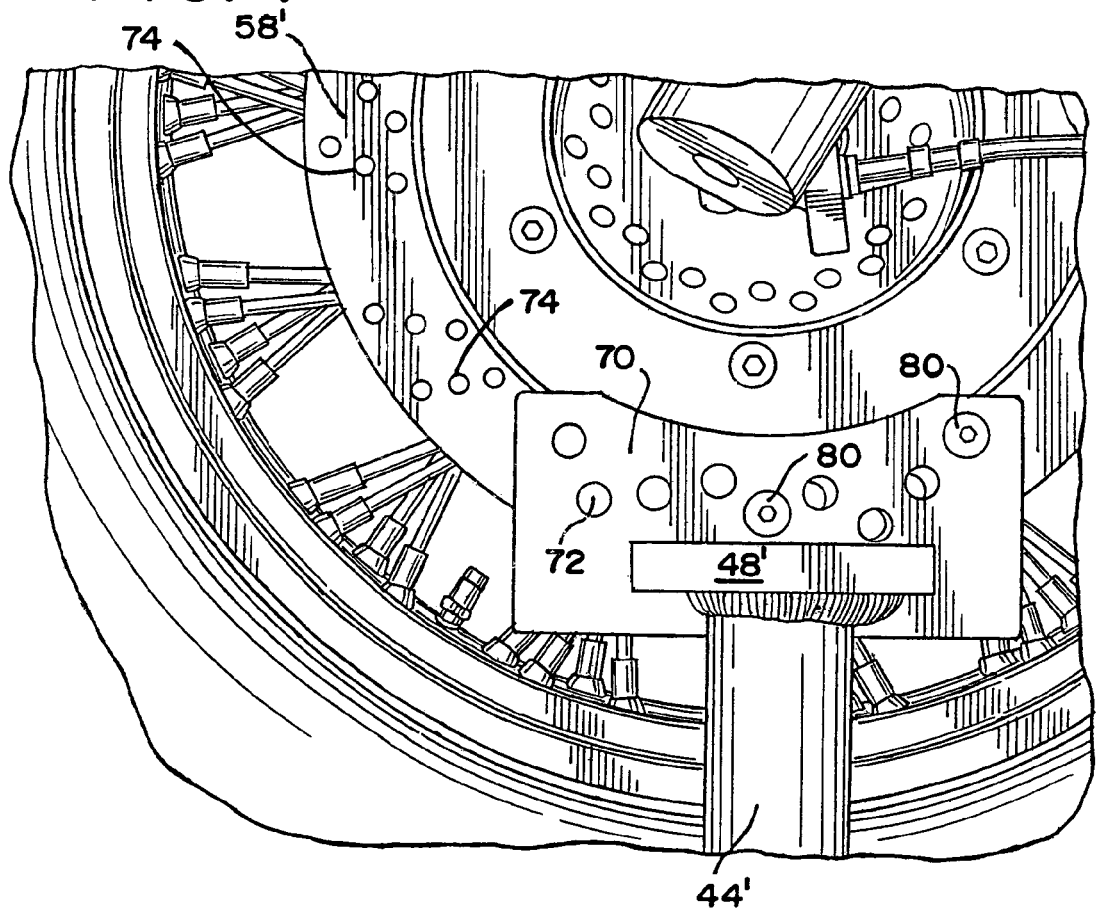
FIG. 4 is a side view of a modified form of the bracket assembly attached to the brake disc of a motorcycle wheel, wherein the brake disc is of the type having radially and circumferentially spaced cooling openings.
Figure 5:
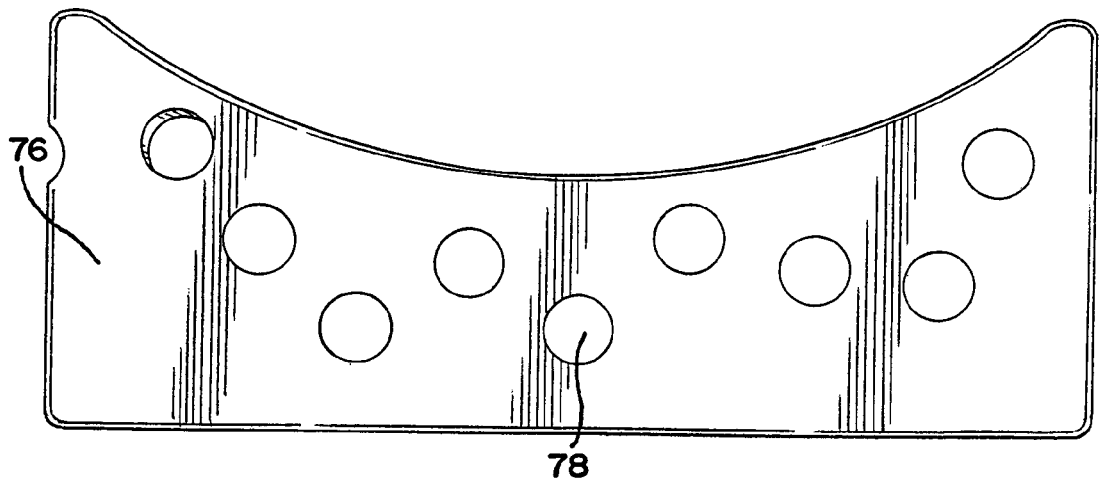
FIG. 5 is a side view of a mounting plate forming part of the modified form of the invention shown in FIG. 4.

Referring now to FIGS. 4 and 5, a modified form of the present invention is provided for use with motorcycles having brake discs with radially and circumferentially spaced cooling openings. The parts of this embodiment that correspond to the embodiment of FIGS. 1–3 are indicated by the prime form of numeral.

As seen in FIG. 4, the sleeve 44' mounts a plate 48' that in turn supports a front plate 70. The plate 70 is provided with a plurality of apertures 72 spaced for registry with cooling openings 74 in the brake disc 58'. A back plate 76 has a plurality of threaded openings 78 arranged for registry with the apertures 72 in the front plate 70. A plurality of fasteners 80, in the form of bolts, are passed through the openings 72 and 74, in the front plate 70 and brake disc 58', respectively, and then threaded into the openings 78 in the back plate 76. Tightening of the bolts 80 will firmly secure the plates 70 and 76 to the brake disc 58'. In all other respects, the embodiment of FIGS. 4 and 5 is the same as the embodiment of FIGS. 1–3.

Figure 6:
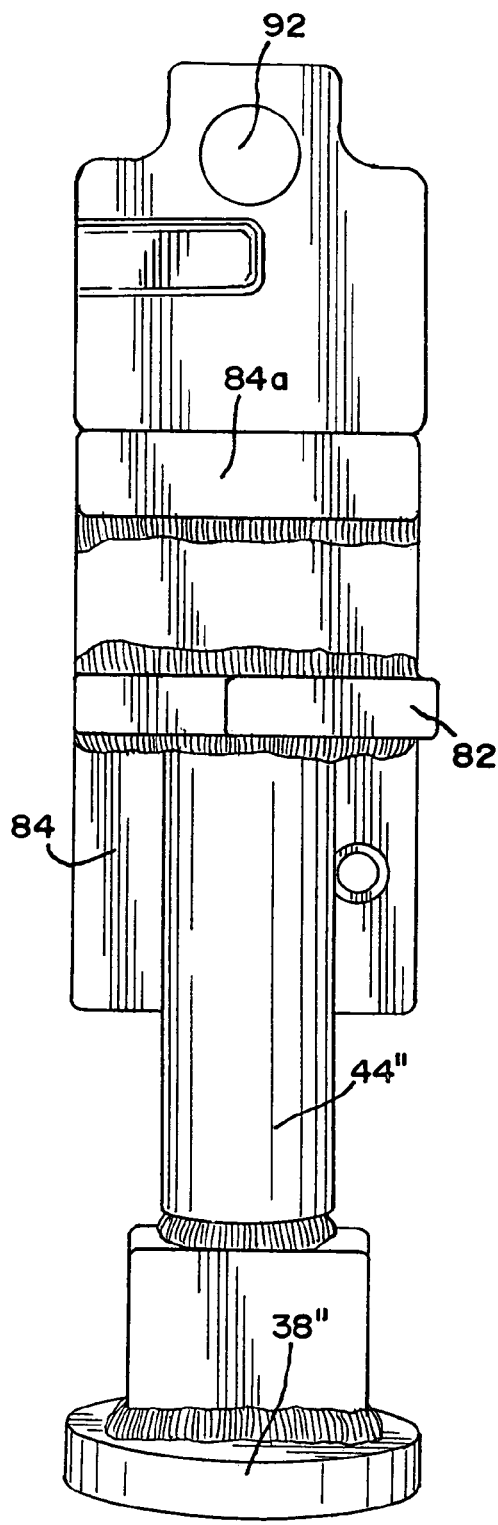
FIG. 6 is a side view of a further modified form of the invention adapted for connection to the axle (not shown) of a motorcycle.
Figure 7:
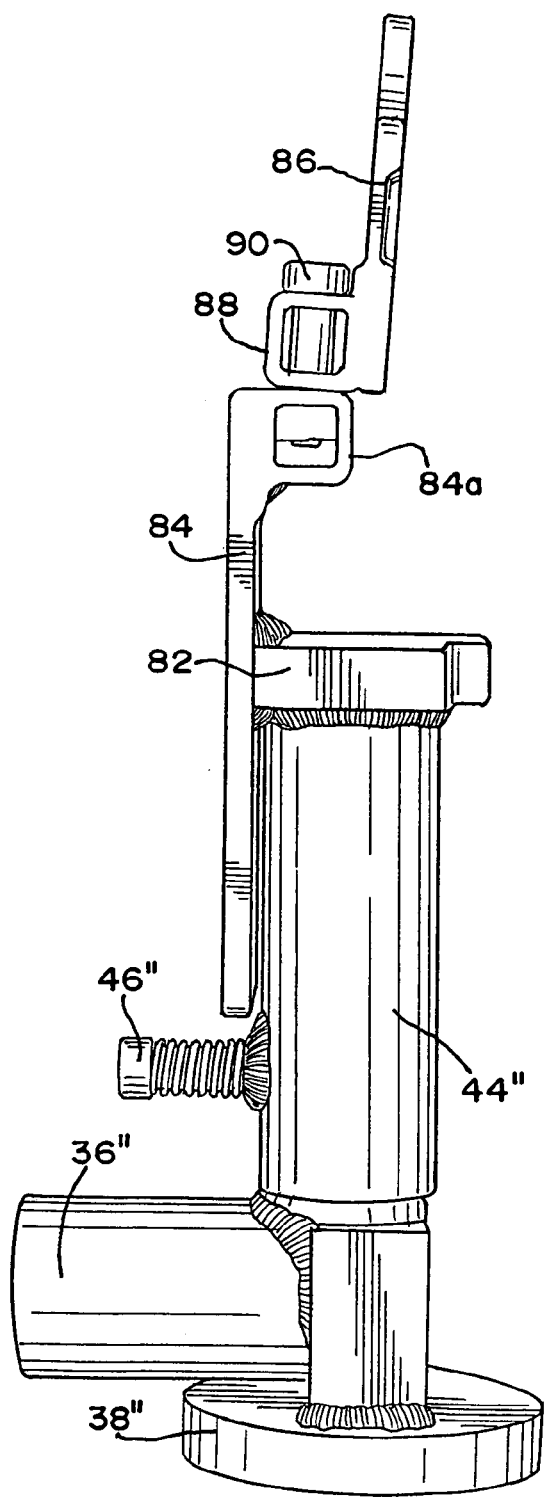
FIG. 7 is an end view of the modification shown in FIG. 6.

A still further embodiment or modification is shown in FIGS. 6 and 7. This embodiment is provided for motorcycles wherein one or both of the front and rear wheel brake assemblies do not have brake discs or do not have brake discs with exposed portions adequate for gripping. Again, the parts corresponding with the embodiment of FIGS. 1–3 are indicated by the double form of prime numerals.

Turning now to FIGS. 6 and 7, the sleeve 44" mounts at its upper end a plate 82, as by welding. A vertically oriented plate 84 is welded to the plate 82 and to a portion of the sleeve 44". The plate 84 has a horizontally offset portion 84a that is provided with a vertically oriented threaded opening (not shown). An adapter plate 86 includes a lug portion having an opening (not shown) for receiving a bolt 90 for threading engagement with the threaded opening in the plate portion 84a. The adapter plate 86 includes an opening 92 for receiving the end portion of the axle (not shown) of a motorcycle wheel assembly. It will be understood that the adapter plate 86 will normally remain attached to the motorcycle axle. Of course, other forms of adapter plates may be provided for attachment to any non-inflatable part of the motorcycle, i.e., parts other than the tires.

When it is desired to use the embodiment of FIGS. 6 and 7, the motorcycle will be positioned adjacent the bracket assembly 10 and the various parts of the bracket assembly will be adjusted such that the threaded opening in the plate portion 84a is positioned just under the opening in the adapter plate offset portion 88. The bolt 90 is then threaded in the opening in the offset portion 84a of the plate 84 for securing the plate 84 to the adapter plate 86. The other parts of the bracket assembly are positioned and secured in the manner described above with respect to the embodiment of FIGS. 1–3.

Figure 8:
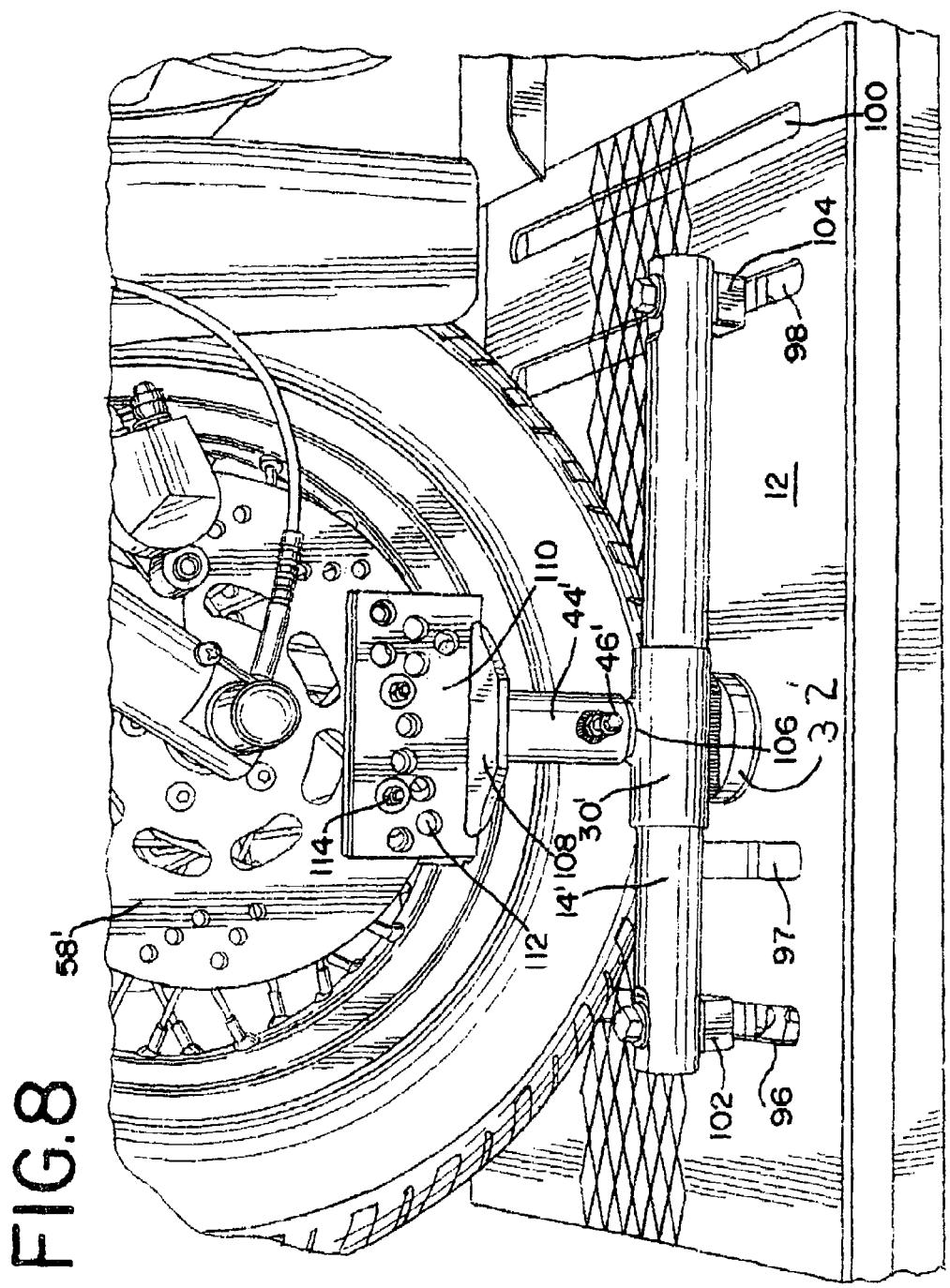
FIG. 8 is a side view of another embodiment of the invention.

Another embodiment of the invention is shown in FIG. 8. This embodiment is similar to the embodiment of FIGS. 1–3 with the exception of the means for achieving lateral adjustment. The parts of the FIG. 8 embodiment corresponding to the embodiment of FIGS. 1–3 are indicated by the prime form of numeral.

Referring now to FIG. 8, the trailer bed 12 is provided with a suitably mounted mounted plate 12a having a plurality of transverse slots 96, 97,98 and 100. The elongated member 14' has fastening mean at its opposite ends in the form of nut and bolt assemblies 102 and 104. These assemblies mount the elongated member 14' in the set of transverse slots 96,98 or 97,100. Of course, the elongated member 14' may be secured in any lateral position as determined by the length of the slots 96, 97,98 and 100.

The sleeve 30' includes a vertically extending cylindrical formation 106 slidably received within the sleeve 44'. Thus vertical adjustment is achieved by loosening and tightening of the bolt 46'. The sleeve 44' is attached to a horizontally disposed plate 108 which in turn is connected to a bracket plate 110. This bracket plate is provided with a plurality of openings 112 receiving fasteners 114 to facilitate attachment to the brake disc 58' of a motorcycle.

The present invention has been described in detail with reference to preferred embodiments thereof. However, variations and modifications can be effected within the spirit and scope of the invention as defined by the following claims.

The invention claimed is:

1. In combination, (A) an apparatus for attachment to a non-inflatable part of a tandem, two-wheel cycle for mounting the cycle to the bed of a trailer for transit purposes, and (B) the trailer having the bed including a planar member with a plurality of parallel slots extending in a first direction, said apparatus comprising:
    (a) a first member and first fastening means for releaseably securing the first member to said planar member in a selected position relative to said slots out of an infinite number of positions along a predetermined limited path;
    (b) a second member engaged with said first member for reciprocal slideable movement relative thereto in directions transverse to said first direction;
    (c) second fastening means engaged with the second member for fixing the position of the second member relative to the first member in an infinite number of positions along a second predetermined limited path;
    (d) a third member slideably engaged with said second member for up and down movement relative thereto, said third member including a bracket member for attachment to the non-inflatable part of the cycle; and
    (e) third fastening means engaged with at least one of the second and third members for fixing the position of the third member relative to the second member in an infinite number of positions along a third predetermined limited path.

2. The apparatus according to claim 1 wherein said first direction is transverse with respect to the trailer.

3. In combination, (A) an apparatus for attachment to a non-inflatable part of a tandem, two-wheel cycle for mounting the cycle to the bed of a trailer for transit purposes, and (B the trailer having the bed including a planar member with a plurality of parallel slots extending in a first direction, said apparatus comprising:
    (a) a horizontally disposed rectilinear member and first fastening means at respective opposite ends of the rectilinear member for releaseably securing the rectilinear member to the planar member in a first selected position out of an infinite number of positions along said slots;
    (b) a first member slideably mounted to said rectilinear member and positionable in a second selected one out of an infinite number of positions along the length of the rectilinear member;
    (c) second fastening means for securing the first member to the rectilinear member in the second selected position relative thereto;
    (d) a second member slideably mounted to the first member for movement in a vertical direction and positionable in a third selected one out of an infinite positions along a vertical path, said second member including a bracket member for attachment to the non-inflatable part of the cycle;
    (e) third fastening means for securing the second member to the first member in the third selected position relative thereto.

4. The apparatus according to claim 3 wherein said first direction is transverse with respect to the trailer.

\* \* \* \* \*